Nov. 14, 1967   W. D. MACHIN ET AL   3,352,635
PROCESS FOR THE PREPARATION OF METAL OXIDES HAVING
AN ENLARGED PORE VOLUME
Filed Sept. 27, 1963   4 Sheets-Sheet 4
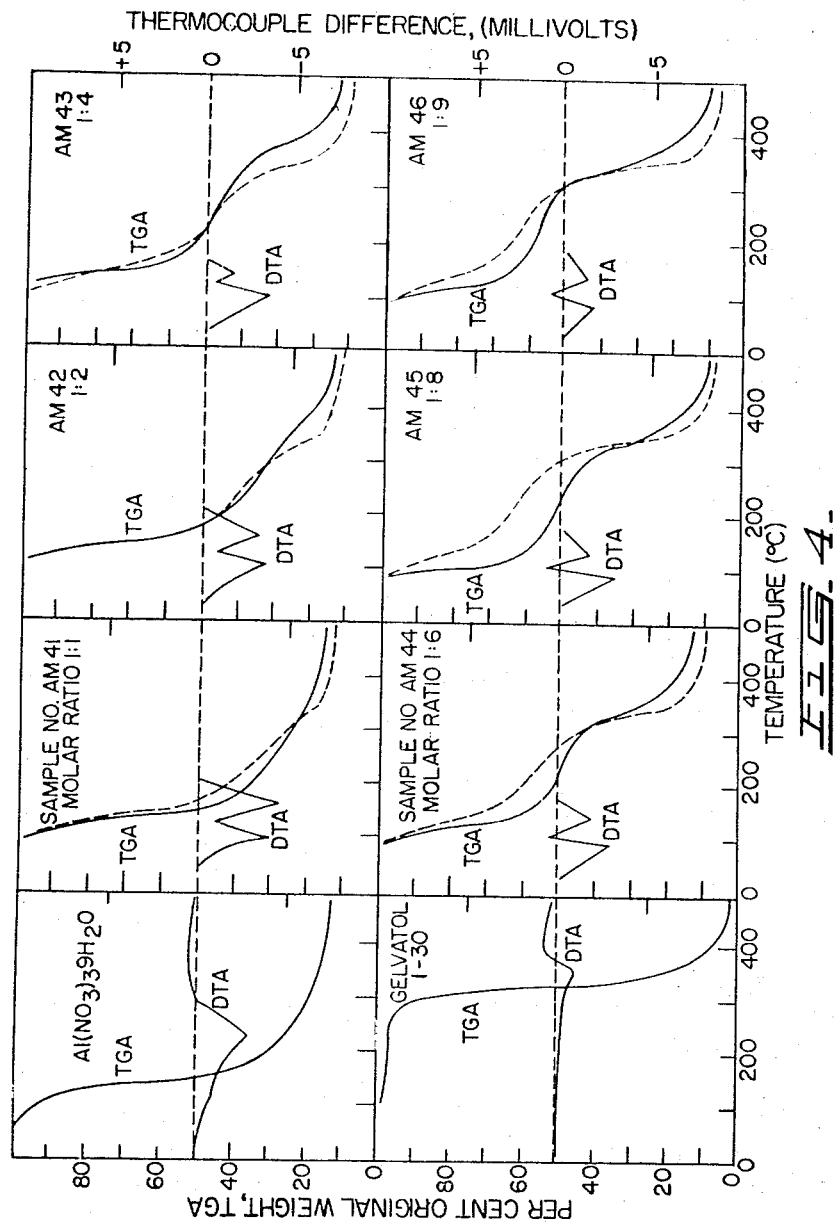
INVENTORS
William D. Machin
Douglas Sargent Montgomery
Basil Ian Parsons
By Stevens, Davis, Miller & Mosher
ATTORNEYS

United States Patent Office 3,352,635
Patented Nov. 14, 1967

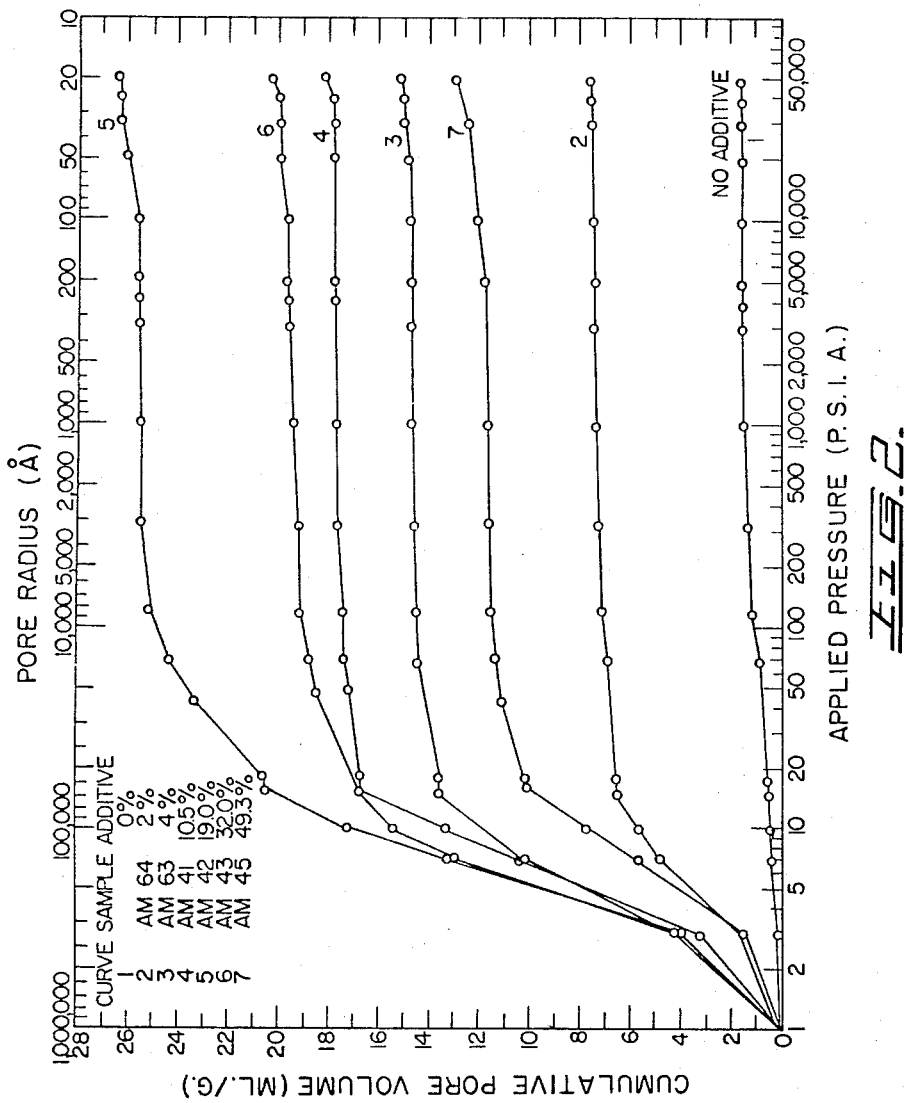

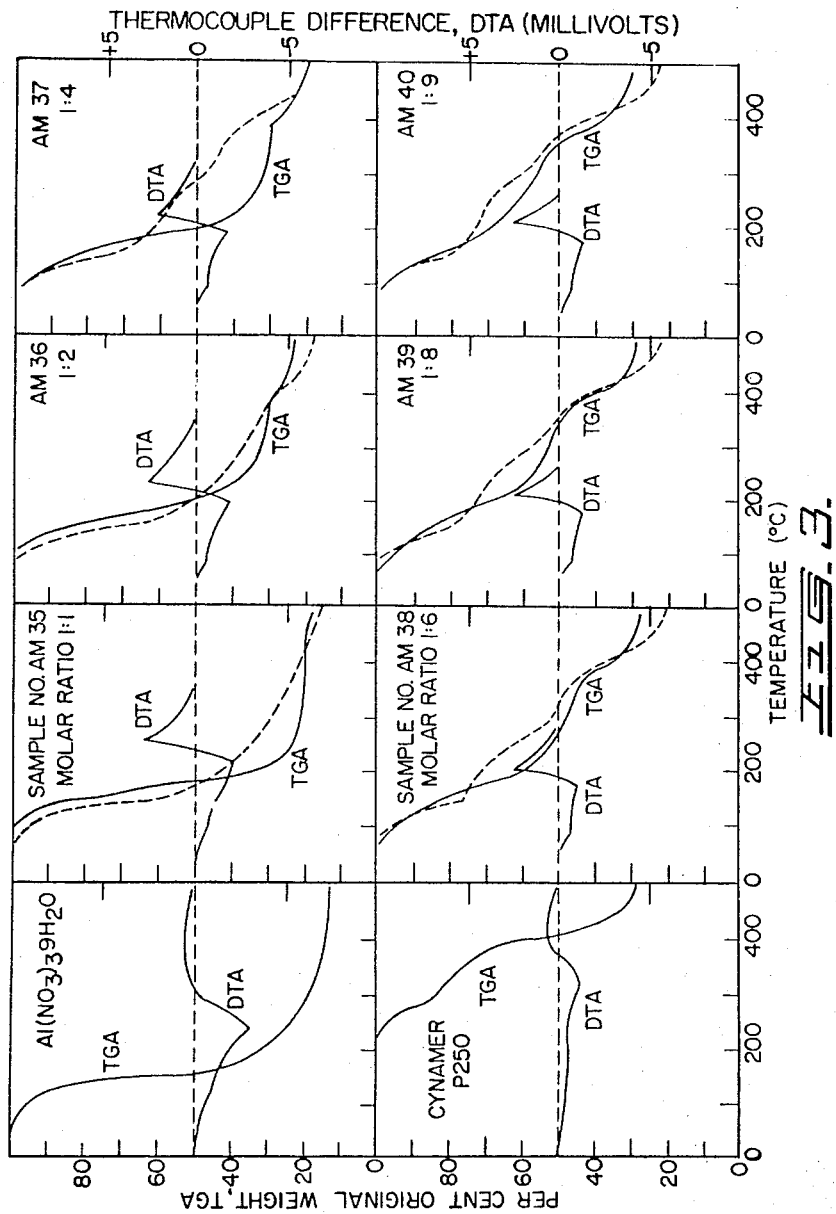

3,352,635
PROCESS FOR THE PREPARATION OF METAL OXIDES HAVING AN ENLARGED PORE VOLUME
William Dean Machin, London, England, and Douglas Sargent Montgomery, Ottawa, Ontario, and Basil Ian Parsons, Kars, Ontario, Canada, assignors to Her Majesty the Queen in right of Canada as represented by the Minister of Mines and Technical Surveys, Ottawa, Ontario, Canada
Filed Sept. 27, 1963, Ser. No. 312,184
Claims priority, application Canada, May 31, 1963, 876,935
11 Claims. (Cl. 23—142)

This invention relates to a process for the preparation of highly porous substantially pure metal oxides. It is directed particularly to a process for the preparation of highly porous substantially pure metal oxides selected from the group consisting of the oxides of aluminum, iron, cobalt, chromium, nickel, calcium and silver, and mixtures thereof, more especially to form an oxide having a specified pore volume in a specified pore size range within the limits of 0.1 to 100 microns.

It is a feature of this invention to provide a process for obtaining a controlled and enlarged pore volume in such oxides, making them more suitable for various applications, for example, high temperature catalytic conversion processes, insulating materials and porous media for the separation of gaseous or liquid substances by diffusion or adsorption processes. Oxides and mixtures of oxides of this type comprise essentially an inorganic structure in which there are pores or spaces.

Generally, the most effective form for a metal oxide for catalytic purposes is that containing a large, accessible surface area and pore volume. The rate of reaction in many important industrial processes using catalysts depends to a large extent on the amount of surface available to the reactants. All other things being equal, the greater the surface area the greater the rate of reaction, and the more accessible or porous the catalyst the less hold up there is of reactants and products in the reaction bed, and the occurrence and rate of undesirable side reactions is minimized. The best known procedures for preparing an oxide containing a large surface and pore volume usually involve (as a first step) the preparation of a suitable salt of the metal as a hydrous inorganic gel. The oxide is obtained by subsequent dehydration, calcination or hydrogenation processes. For example, aluminum or iron oxides containing large surface areas and pore volumes are commonly prepared by dehydrating hydrous aluminum or ferric hydroxide gels. The hydroxide gel is prepared by adding a base, such as ammonium hydroxide to a solution of a suitable salt of the metal such as aluminum or ferric nitrate. It is in the dehydration process that the porous nature of the substance (pore volume and surface area) is created. The mass of the precipitate shrinks in size as the bulk of the water is driven off. Eventually, the inorganic skeleton of the structure sets and the space remaining when the last of the solvent is removed comprises the porous nature of the material.

There are a number of difficulties in the preparation of a highly porous oxide by the hydrous gel technique. The process is only effective where it is possible to form a hydrous gel containing the metal cation in question. A great many metals do not have a chemical form which lends itself to the preparation of a hydrous inorganic gel. Where it is possible to form a hydrous gel, the more water the metal salt system will co-ordinate with, the more easily a highly porous form of the oxide can be prepared. For example, aluminum and iron hydroxides, as formed by precipitation with a base from suitable water solutions of the metal salts, co-ordinate with large volumes of water to form gels containing 80 to 98% water. Such gels dehydrate to yield the corresponding oxide with a pore volume of approximately 0.5 to 1.0 ml./g. Metal systems such as nickel and chromium, which do not form precipitates incorporating as much water as the aluminum or iron hydroxides, yield oxides containing a considerably smaller pore volume. Even in those cases where it is possible to form a satisfactory gel, the preparation and handling of this type of material is not easy. The filtration and concentration of voluminous precipitates is usually a very slow operation. Furthermore, the release of the oxide by dehydration and calcination requires much heat per unit weight of the final product obtained, and is therefore costly.

Various techniques have been proposed to increase the pore volume of the oxide resulting from the precipitation and dehydration of hydrous gels, all of which further complicate the process and increase the cost. The basis of several of these processes is the alteration of the surface tension of the liquid contained in the gel, the principle being that by lowering the surface tension of the liquid the forces tending to draw the inorganic matter together are similarly reduced resulting in a more open structure. One process heretofore suggested of achieving this reduction in surface tension is by heating the gel mass under high pressure above the critical temperature of the solvent. Under these circumstances, the liquid can be removed in the vapour state with no surface tension effects. A modification of this technique is described as a "hot sweating process" in which a gel, primarily silica gel, is heated from 80 to 150° C. without allowing the escape of water. By this means, the gel is set in a way which reduces the extent of shrinkage in subsequent conventional drying operations. Another process entails the solution of small amounts of surface active agents to depress somewhat the surface tension of the liquid in the gel.

Leaching processes have also been used as a means of increasing the porosity. For example, hydrous gels soaked in a solution of a metallic salt, such as calcium chloride, can be then dried and freed of the salt by washing. Similarly, pellets or extruded shapes of hydrogel containing calcium carbonate can be formed then dried and finally extracted with acid to remove the calcium carbonate. Soaps have also been included in the solutions before gelation and afterwards removed by leaching. Several processes involving volatilization and gasification for the improvement of the porosity have been reported as well. Finely divided or colloidal sulphur suspended in the wet gel can be later distilled out of the finished product. Soluble polysulphides have been used for the same purpose. An example of gasification is the case where a plastic gel is subjected to a high pressure of an inert gas in an enclosed vessel. The material can then be "popped" or foamed by suddenly releasing the pressure.

Still another approach to the problem of increasing the porosity of gels is based upon the inclusion of quantities of organic matter in the hydrous gel. In United States application Ser. No. 121,549 of D. S. Montgomery and B. I. Parsons, filed July 3, 1961 there is provided a process for enlarging and controlling the pore volume in inorganic oxides such as alumina and silica gel by the addition of large amounts of water soluble organic polymers to the hydrous gel in the course of its preparation. The mixture of hydrous gel and polymer is then dehydrated at a low temperature until the inorganic structure sets and the organic matter is removed finally by calcination, by thermal decomposition followed by calcination or hydrogenation. Polymers that were found to be effective were the polyethylene glycols, the polyethylene oxides, the polyvinyl alcohols, the polyacrylamides and the methyl cellulose compounds. Pore volumes as great as 5 ml./g. in alumina and silica gels were obtained using this process.

While the above-mentioned technique of adding water soluble polymers to the hydrous gel increases the pore volume of the final gel and affords considerable control over the pore size and pore volume distribution, it still requires the precipitation of the metal in the form of a hydrous compound with all of the associated limitations and difficulties that accompany that basic process. Thus, it is a primary feature of the present invention to provide a process for preparing such metal oxides wherein a specific precipitation step is not required.

By a broad aspect of the present invention, there is provided a process for the preparation of a highly porous, substantially pure metal oxide of a metal selected from the group consisting of aluminum, iron, cobalt, chromium, nickel, calcium and silver and mixtures thereof, said oxide having a specified pore volume in a specified pore size range within the limits of 0.1 to 100 microns, said process comprising:

(a) Intimately mixing a finely divided fusible salt of the aforesaid selected metal with at least one water soluble organic polymer possessing functional groups capable of reacting with the cation of said metal, said polymer being selected from the group consisting of polyvinyl alcohols, polyacrylamides and copolymers containing vinyl alcohols and acrylamides, said polymer further being soluble in said fused salt, being stable at the drying temperature of said fused salt but being combustible at the calcining temperature of said metal oxide, said polymer being present in an amount of 0.5 to 65% by weight;

(b) Melting said mixture of said salt and said polymer thereby forming a hydrated co-ordinate compound thereof;

(c) Heating and dehydrating said mixture until said co-ordinate compound decomposes, thereby yielding said metal oxide in highly porous forms; and (d) Calcining said oxide, thereby to remove therefrom any residue remaining therein.

The process of this invention not only permits control of the pore volume distribution but also eliminates the difficulty in handling and concentrating voluminous precipitates and reduces greatly the amount of heat required in dehydration and calcination. The changes in pore volume brought about by the present process are satisfactory for many purposes.

The polymers that have been tested and found to have notable effects are:

(1) The polyvinyl alcohols (known by the trademark of Gelvatols) manufactured by the Shawinigan Resins Co., Springfield, Massachusetts; and (2) The polyacrylamides (known by the trademarks of Pam and Cyanamer) manufactured by the American Cyanamid Co., New York City.

It has been found that only polymers with functional groups capable of reaction with the metal cation contained in the salt are useful in the process of the present invention. In addition, the polymer must be reasonably stable at low drying temperatures so that the bulk of the water can be driven off, but completely combustible at the calcining temperature of the metal oxide.

A variety of finely divided easily fusible salts may be used in the process of the present invention. Among these are:

| | |
|---|---|
| Aluminum nitrate | $Al(NO_3)_3 \cdot 9H_2O$ |
| Cobalt nitrate | $Co(NO_3)_2 \cdot 6H_2O$ |
| Chromium nitrate | $Cr(NO_3)_3 \cdot 9H_2O$ |
| Nickel nitrate | $Ni(NO_3)_2 \cdot 6H_2O$ |
| Iron nitrate | $Fe(NO_3)_3 \cdot 9H_2O$ |
| Calcium nitrate | $Ca(NO_3)_2 \cdot 4H_2O$ |
| Silver nitrate | $AgNO_3$ | as well as others.

The cumulative pore volume distribution in the various samples was determined by the method of mercury penetration briefly as follows:

A weighed sample of dried gel was placed in a dilatometer and evacuated overnight in a glass apparatus at a temperature of approximately 200° C. The dilatometers were then filled with mercury at approximately 1 p.s.i.a. The pressure over the surface of the mercury in the dilatometer was increased in stages up to atmospheric pressure and the cumulative pore volume at each pressure stage was determined by the change in level of the mercury in the dilatometer. Up to one atmosphere pressure the level of mercury in the dilatometer was determined with a cathetometer. At one atmosphere the dilatometers were transferred from the glass apparatus to a steel pressure vessel and the pressure increased in stages up to 60,000 p.s.i. The change in level of the mercury at the elevated pressures was determined by measuring the resistance (and hence the length) of a fine platinum wire threaded along the capillary of the dilatometer. The radius of the smallest pores that mercury can enter at any given pressure was calculated from the equation:

$$r = \frac{-25 \cos a}{p} \times 1.45 \times 10^3$$

where $P$ = pressure (in p.s.i.a.)
$r$ = pore radius (A.)
$s$ = surface tension of mercury at the temperature of the experiments (480 dynes per cm.)
$a$ is the contact angle, usually close to 140° and $1.45 \times 10^3$ is the conversion factor to consistent units

The cumulative pore volume at various pore radii, or the pore volume distribution, is then known.

The following example indicates a manner of carrying out the invention and illustrates the general process of preparation according to this invention.

*Example 1.—Aluminum oxide (sample number AM42)*

Aluminum nitrate $(Al)(NO_3)_3 \cdot 9H_2O$ and polyvinyl alcohol (Gelvatol 1-30, manufactured by the Shawinigan Resins Co., Springfield, Mass.) were each ground to pass a 30 mesh U.S. Standard screen. Five grams of Gelvatol 1-30 and 21.3 grams aluminum nitrate were placed in a jar and mixed by tumbling for approximately one hour. The mixture was then spread out over the bottom of a fused silica tray and placed in a calcining furnace operating at 550–600° C. The mixture was brought up to temperature slowly (over approximately 10–15 minutes) by moving the silica tray stepwise from the front of the muffle furnace where the temperature was about 100° C., to the rear of the heating chamber where the temperature was 600° C. The sample was held at 550–600° C. for 4 to 6 hours or until no carbon residue remained.

For small samples, such as aluminum oxide (AM 42), the mixtures can be inserted directly into a calcining atmosphere. For larger samples it has been found best, first, to heat the mixture slowly in an inert atmosphere, or in an atmosphere containing only a small amount of oxygen, fusing the salt and polymer at a low temperature (100–200° C.) then continuing the heating cycle up to where the polymer decomposes and the oxide is released. If uncontrolled amounts of air are used directly with a large sample the temperature of the oxide rises far above 600° C. due to the heat of combustion of the additive, and the pore volume and surface area of the final product is reduced because of sintering. This precaution must be taken in all those cases of oxides where high temperatures alter either the physical, chemical or crystal structure. Ultimately, of course, the residue of carbon must be removed. Where the gels cannot be heated to the temperature necessary to remove the organic polymer by calcination or combustion techniques, a satisfactory method is hydrogenation.

In the drawings forming part of the present disclosure,

FIG. 2 is a semi-log graph of the effect of polyvinyl alcohols on the cumulative pore volume in aluminum oxide;

FIG. 3 shows thermogravimetric and differential thermal analyses of mixtures of aluminum nitrate and a polyacrylamide; and FIG. 4 shows thermogravimetric and differential thermal analyses of mixtures of aluminum nitrate and a polyvinyl alcohol.

Figure 1:
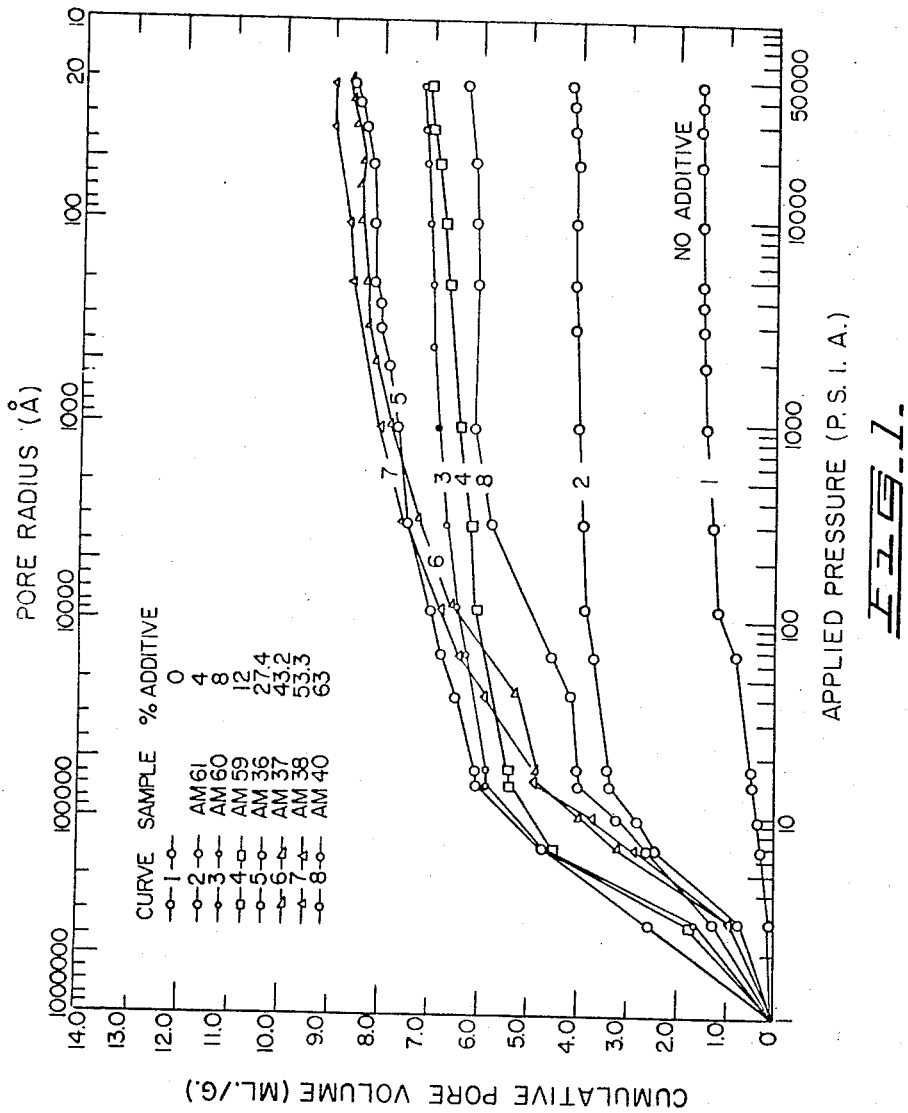
FIG. 1 is a semi-log graph of the effect of polyacrylamides on the cumulative pore volume in aluminum oxide.

The effect of polyvinyl alcohols and polyacrylamide polymers on the pore structure of aluminum oxide is shown in Table 1 and FIGURES 1 and 2. Each sample was prepared using the process described in Example 1. The various proportions of aluminum nitrate and polymer are shown below in Table 1:

roughness is greatly effected by local heating and sintering in the calcination process and the erratic effect of the polymer on the surface area is attributed primarily to poor temperature control in the course of burning off the organic matter. Aluminum oxide samples AM 35, 36, 44, 45 and 46 possessed surface areas of the same order as aluminum oxide prepared by calcining pure aluminum nitrate i.e. in the range 50 to 90 m.$^2$/g.

An important step in the present invention is the melting of the mixture of the readily fusible metal salt and the polymer, whereby to form a hydrated co-ordinate compound of the metal and the polymer. Strong evidence of such compound formation between aluminum and the polyvinyl alcohol and polyacrylamide polymers is shown by thermogravimetric (TGA) and differential thermal analysis (DTA). The results of such analyses on the samples of aluminum oxide described in Table 1 are shown in FIGURES 3 and 4.

Aluminum nitrate begins to decompose in the region of 70–100° C. and proceeds rapidly thereafter. At 200° C., 30% of the original weight remains and at temperatures TABLE 1.—THE EFFECT OF POLYVINYL ALCOHOL AND POLYACRYLAMIDE POLYMERS ON THE PORE STRUCTURE OF ALUMINUM OXIDE

| Sample No. | Additive | Weight of Additive (g.) | Weight of Al(NO$_3$)$_3$.9H$_2$O (g.) | Total Wt. Mixture (g.) | Theoretical Yield Al$_2$O$_3$ (g.) | Molar Ratio Al:Monomer | Wt. percent Additive in Initial Mixture | Wt. percent Additive on Dry Oxide Basis | Total Pore Volume (ml./g.) | Surface Area (m.$^2$/g.) |
|---|---|---|---|---|---|---|---|---|---|---|
| Blank | | 0 | 100 | 100 | 13.9 | | 0 | 0 | 1.57 | 91 |
| AM 64 | Gelvatol-1-30 | 5.0 | 245 | 250 | 34.1 | | 2.0 | 12 | 9.6 | 17 |
| 63 | | 5.0 | 120 | 125 | 16.7 | | 4.0 | 24 | 15.2 | 19 |
| 62 | | 5.0 | 66.5 | 71.5 | 9.23 | | 7.0 | 54 | 16.2 | 26 |
| 41 | | 5.0 | 42.5 | 47.5 | 5.90 | 1:1 | 10.5 | 85 | 18.2 | 73 |
| 42 | | 5.0 | 21.3 | 26.3 | 2.96 | 1:2 | 19.0 | 170 | 26.4 | 33 |
| 43 | | 10.0 | 21.3 | 31.3 | 2.96 | 1:4 | 32.0 | 340 | 20.3 | 31 |
| 44 | | 10.0 | 14.2 | 24.2 | 1.97 | 1:6 | 41.3 | 508 | 18.3 | 50 |
| 45 | | 10.0 | 10.3 | 20.3 | 1.43 | 1:8 | 49.3 | 700 | 12.9 | 83 |
| 46 | | 10.0 | 9.5 | 19.5 | 1.32 | 1:9 | 51.3 | 758 | 12.7 | 76 |
| AM 61 | Cyanamer P250 | 10.0 | 240 | 250 | 33.3 | | 4.0 | 31 | 4.4 | 71 |
| 60 | | 10.0 | 115 | 125 | 16.0 | | 8.0 | 62 | 7.4 | 64 |
| 59 | | 10.0 | 73.3 | 83.2 | 10.2 | | 12.0 | 97 | 7.3 | 62 |
| 35 | | 10.0 | 53.0 | 63.0 | 7.35 | 1:1 | 15.9 | 136 | 7.2 | 77 |
| 36 | | 10.0 | 26.5 | 36.5 | 3.68 | 1:2 | 27.4 | 272 | 8.7 | 50 |
| 37 | | 10.0 | 13.2 | 23.2 | 1.83 | 1:4 | 43.2 | 544 | 8.5 | 19 |
| 38 | | 11.4 | 10.0 | 21.4 | 1.39 | 1:6 | 53.3 | 820 | 9.1 | 31 |
| 39 | | 15.2 | 10.0 | 25.2 | 1.39 | 1:8 | 60.3 | 1,090 | 8.6 | 25 |
| 40 | | 17.0 | 10.0 | 27.0 | 1.39 | 1:9 | 63.0 | 1,220 | 6.3 | 28 |

The cumulative pore volume distribution curves for some of the samples are shown in FIGURES 1 and 2. The total pore volume for all the samples is given in Table 1. As used in the present specification the term "total pore volume" is intended to mean the cumulative pore volume in all pores greater than 20 A. radius.

As seen in FIGS. 1 and 2 and in Table 1, aluminum oxide prepared by calcining pure aluminum nitrate has a total pore volume of approximately 1.6 ml./g., with the majority of the pores occurring in the 50 to 0.1 micron range. The effect of increasing concentrations of either polyvinyl alcohol (FIG. 2) or polyacrylamide (FIG. 1) was to bring about a very large increase in the pore volume in the 100 to 0.1 micron range. With both types of polymer, the effect of concentration passed through a maximum. In the case of the aluminum nitrate-Gelvatol mixtures (FIG. 2) the total pore volume increased systematically with concentration up to 26 ml./g. at approximately 19% by weight of polymer. At concentrations greater than 19% the total pore volume decreased to 12 to 13 ml./g. A similar type of effect occurred with the Cyanamer P250 polymer although the effect was not as marked (FIG. 1). The total pore volume increased systematically up to approximately 8 to 9 ml./g. at 27.4% polymer, decreasing to 6 ml./g. at concentrations greater than 50%.

The surface area of aluminum oxide prepared with either the Gelvatol or Cyanamer polymers did not follow any definite trend with the concentration of polymer. The surface area of each sample, as determined by the method of the adsorption of nitrogen is given in Table 1. Surface greater than 400° C. the percent original weight corresponds to the percentage of Al$_2$O$_3$ in Al(NO$_3$)$_3$.9H$_2$O, i.e. 13.6%. Differential thermal analysis indicates that the decomposition is endothermic.

Thermogravimetric analysis of Gelvatol 1-30 indicates that decomposition proceeds in a single step at temperatures greater than 300° C. Virtually no residue remains at 500° C. These results suggest that the polymer decomposes into the monomer, which readily vaporizes. Again, DTA indicates that the decomposition of Gelvatol is endothermic.

In the case of Cyanamer P250, the decomposition begins at 250° C. and proceeds in two steps. In the first step about 25% of the original weight is lost, corresponding to the removal of the NH$_2$ group from the polymer. Thereafter another 46% of the original weight is lost, corresponding to the removal of CO and H$_2$. The residue at 500 C. (29% original weight) is very nearly equal to the theoretical weight of the carbon skeleton of the polymer (33.8%). Differential thermal analysis indicates also that the decomposition is endothermic.

The results of the thermogravimetric and differential thermal analyses of the mixtures of aluminum nitrate and polyvinyl alcohol and polyacrylamide polymers indicate compound formation of the type Al (Monomer)$_4$. In FIGURES 3 and 4 the solid lines marked TGA are the experimental results of the thermogravimetric analyses: the broken lines indicate the predicted theoretical result calculated from the analyses of the pure, individual components assuming no interaction or compound formation.

With all of the samples of the polyacrylamide series (FIG. 3) it is evident that decomposition in the region of 200–400° C. proceeds more readily than the decomposition of the pure components. The results of the differential thermal analyses also show that at 150° C. the mixtures undergo a chemical reaction of a highly exothermic nature; the temperature in all cases rising approximately 100° C. very rapidly. Thermogravimetric analyses of the mixtures all have similar shapes—showing a large decrease in the percent original weight in the range 100–200° C., followed by a plateau, or region of only slowly decreasing weight in the region 200 to 400° C., which is, in turn, followed by a region of appreciable weight loss. The most important feature of the analyses of the mixtures is that the decomposition show no step corresponding to the elimination of the $NH_2$ group. From this it is concluded that one of the steps in the process is the hydrolysis of the amide functional group.

The position of the experimentally observed plateau in the thermogravimetric analyses of the mixtures of aluminum nitrate and Cyanamer P 250 could be calculated with considerable accuracy assuming the following scheme: (a) the hydrolysis of the amide group, (b) the formation of a stable compound of the type $Al(Monomer)_4$ which, together with any $Al_2O_3$ resulting from an excess amount aluminum nitrate present, constitutes the plateau and finally, (c) at higher temperatures the decomposition of the co-ordinate compound $Al(Monomer)_4$ and the formation of $Al_2O_3$. A comparison of the observed and predicted positions of the plateau and the percent weight loss after the plateau using this scheme is shown in Table 2.

TABLE 2

| Sample Number | Position of Plateau | | Weight Loss After Plateau | |
|---|---|---|---|---|
| | Predicted [1] | Observed [1] | Predicted [1] | Observed [1] |
| AM 35 | 22.5 | 20–30 | 3.5 | 2–3 |
| AM 36 | 26.7 | 30 | 5.4 | 7 |
| AM 37 | 34.2 | 30–32 | 8.5 | 10 |
| AM 38 | 45.7 | 42–48 | 19.6 | 23 |
| AM 39 | 54.0 | 48–51 | 27.4 | 22 |
| AM 40 | 59.4 | 57–59 | 31.9 | 28 |

[1] Percent original weight.

There was also strong evidence of compound formation with the aluminum nitrate-Gelvatol mixtures (FIG. 4). The differential thermal analyses all indicate the occurrence of an exothermic chemical reaction immediately after the $Al(NO_3)_3.9H_2O$ has melted (M.P.=70° C.) which raises the overall temperature of the reactants to about 100° C., at which point extensive decomposition and weight loss takes place. The observed weight losses with the mixtures in the region of 300° C. can be calculated following much the same scheme as that proposed to account for the plateau in the aluminum nitrate-Cyanamer decomposition curves, i.e., the formation of a stable compound of the type $Al(Monomer)_4$, with the addition of a reaction step to account for the greater weight losses arising in those samples containing an excess of polymer.

The thermogravimetric analyses of the pure components indicate that at 300° C. any $Al(NO_3)_3.9H_2O$ would be decomposed and that excess polyvinyl alcohol should be only slightly decomposed. The experimental decomposition curves of mixtures AM 41, 42 and 43 were very similar to those drawn from the calculated values. With the mixtures AM 44, 45 and 46, on the other hand (those containing an excess of polymer over that required to form $Al(Monomer)_4$) more weight was lost up to 300° C. than one would calculate from the decomposition of the pure components. The presence of black tars in these samples suggested that the additional weight losses could be attributed to the attack of the nitrate anion on the excess polymer, E.g.,

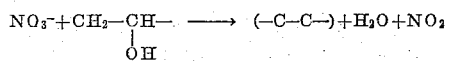

leaving the carbon skeleton of the polymer more or less intact. The scheme which best accounted for the weight losses in the region of 300° C. was then as follows:

At 300° C. the percent original weight is made up of:
(a) $Al_2O_3$ from excess $Al(NO_3).9H_2O$.
(b) $Al(Monomer)_4$.
(c) Carbon skeleton of polymer (—C—C—) from the reaction of $NO_3^-$ with excess polymer, and
(d) —$CH_2$—CHOH— from unreacted polymer.

After 300° C. the weight losses are the result of:
(a) The decomposition of $Al(Monomer)_4$ and the formation of $Al_2O_3$ and
(b) The removal of excess —$CH_2$—CHOH—

A comparison of the observed and predicted weight losses up to, and after, 300° C. calculated on this basis is shown in Table 3.

TABLE 3

| Sample Number | Percent Orig. Wt. up to 300° C. | | Percent Orig. Wt. Loss over 300° C. | |
|---|---|---|---|---|
| | Predicted [1] | Observed [1] | Predicted [1] | Observed [1] |
| AM 41 | 23.2 | 24 | 11.1 | 9 |
| AM 42 | 31.1 | 31 | 20.1 | 18 |
| AM 43 | 43.0 | 43 | 33.4 | 30 |
| AM 44 | 44.7 | 44 | 29.2 | 32 |
| AM 45 | 48.7 | 46 | 31.8 | 36 |
| AM 46 | 51.5 | 53 | 35.6 | 42 |

[1] Percent original weight.

The embodiments of the invention in which an exclusive property or privilege is claimed are defined as follows:

1. A process for the preparation of a highly porous, substantially pure metal oxide of a metal selected from the group consisting of aluminum, iron, cobalt, chromium, nickel, calcium and silver and mixtures thereof, said oxide having a pore size range within the limits of 0.1 to 100 microns, said process comprising:
(a) intimately mixing a finely divided fusible salt of a metal selected from the group consisting of aluminum, iron, cobalt, chromium, nickel, calcium and silver with at least one water soluble organic polymer possessing functional groups capable of reacting with the cation of said metal, said polymer being selected from the group consisting of polyvinyl alcohols, polyacrylamides and copolymers containing vinyl alcohols and acrylamides, said polymer further being soluble in said fused salt, being stable at the drying temperature of said fused salt but being combustible at the calcining temperature of said metal oxide, said polymer being present in an amount of 0.5 to 65% by weight;
(b) melting said mixture of said salt and said polymer, thereby forming a hydrated co-ordinate compound thereof;
(c) heating and dehydrating said mixture until said co-ordinate compound decomposes, thereby yielding said metal oxide in highly porous form; and
(d) calcining said oxide at a maximum temperature of 600° C., thereby to remove therefrom any residue remaining therein.

2. The process of claim 1 wherein said fusible salt is a nitrate.

3. The process of claim 1 wherein said heating and dehydrating step is carried out in air.

4. The process of claim 1 wherein said heating and dehydrating step is carried out in an inert gas stream.

5. The process of claim 4 wherein said inert gas stream contains a small amount of oxygen.

6. The process of claim 2 wherein said heating and dehydrating step is carried out at a temperature in the range of 200–500° C. in air, in an inert gas stream or an inert gas stream containing a small amount of oxygen.

7. The process of claim 6 wherein said calcining step is carried out at a temperature of 500–600° C.

8. A process for the preparation of a highly porous, substantially pure metal oxide of a metal selected from the group consisting of aluminum, iron, cobalt, chromium, nickel, calcium and silver and mixtures thereof, said oxide having a pore size range within the limits of 0.1 to 100 microns, said process comprising:
(a) blending at least one water soluble organic polymer possessing functional groups capable of reacting with the cation of said metal, said polymer being selected from the group consisting of polyvinyl alcohols, polyacrylamides and copolymers containing vinyl alcohols and acrylamides, with a salt of a metal selected from the group consisting of aluminum, iron, cobalt, chromium, nickel, calcium and silver, said polymer further being soluble in said salt solution, being stable at the drying temperature of said salt but being combustible at the calcining temperature of said metal oxide, said polymer being present in an amount of 0.5 to 65% by weight melting said blend, thereby forming a hydrated co-ordinate compound thereof;
(b) heating and dehydrating said blend to a temperature in the range of 200 to 500° C., in a medium selected from air, an inert gas stream and an inert gas stream containing a small amount of oxygen until said co-ordinate compound decomposes, thereby yielding said metal oxide in highly porous form; and
(c) calcining said oxide at a temperature of 500 to 600° C., thereby to remove therefrom any residue remaining therein.

9. The process of claim 8 wherein said fusible salt is a nitrate.

10. The process of claim 8 wherein said fusible salt is aluminum nitrate, wherein said organic polymer is a polyvinyl alcohol, and wherein said heating and dehydrating step is carried out at temperature in the range of 300–500° C.

11. The process of claim 8 wherein said fusible salt is aluminum nitrate, wherein said organic polymer is a polyacrylamide, and wherein said heating and dehydrating step is carried out at a temperature in the range of 300–500° C.

References Cited

UNITED STATES PATENTS

| | | | |
|---|---|---|---|
| 3,111,396 | 11/1963 | Ball | 264—44 |
| 3,258,349 | 6/1966 | Scott | 106—41 |

OSCAR R. VERTIZ, *Primary Examiner.*

H. T. CARTER, *Assistant Examiner.*